United States Patent [19]

Sitzler et al.

[11] 4,454,703
[45] Jun. 19, 1984

[54] SOLAR PANEL

[75] Inventors: Edward R. Sitzler; Fred W. Moore, both of Louisville, Ky.

[73] Assignee: Solar Structures Corp., Louisville, Ky.

[21] Appl. No.: 320,350

[22] Filed: Nov. 12, 1981

[51] Int. Cl.³ .............................................. A47G 1/00
[52] U.S. Cl. ........................................ 52/788; 52/732; 52/790
[58] Field of Search ................ 52/788, 202, 732, 483, 52/656, 790, 479, 398; 428/34

[56] References Cited

U.S. PATENT DOCUMENTS

| | | | |
|---|---|---|---|
| 2,974,377 | 3/1961 | Kunkle | 52/790 |
| 3,054,153 | 9/1962 | Partsch | 52/788 X |
| 3,276,177 | 10/1966 | Keller | 52/793 X |
| 3,425,163 | 2/1969 | Horgan, Jr. | 52/788 X |
| 3,782,054 | 1/1974 | Goss, Jr. | 52/656 X |
| 3,820,298 | 6/1974 | Kirsch | 52/475 |
| 4,069,641 | 1/1978 | DeZutter | 52/202 |
| 4,357,187 | 11/1982 | Stanley et al. | 52/788 X |

*Primary Examiner*—Carl D. Friedman
*Attorney, Agent, or Firm*—Richard L. Caslin

[57] ABSTRACT

A solar panel is shown for use as a double panel window structure. It has an outer frame formed by an H-shaped extrusion that has one of its outermost legs shortened, and a pair of generally parallel legs or flanges that are inwardly directed of the frame. The outer surface of these flanges are furnished with a dual pressure-sensitive adhesive tape having a width between ¼ inch and 1 inch. A pane of transparent material is sealed around its periphery into engagement with the adhesive tape for forming a double pane solar panel. Several modifications are also shown for exerting a mechanical locking force on at least one of the panes.

5 Claims, 12 Drawing Figures

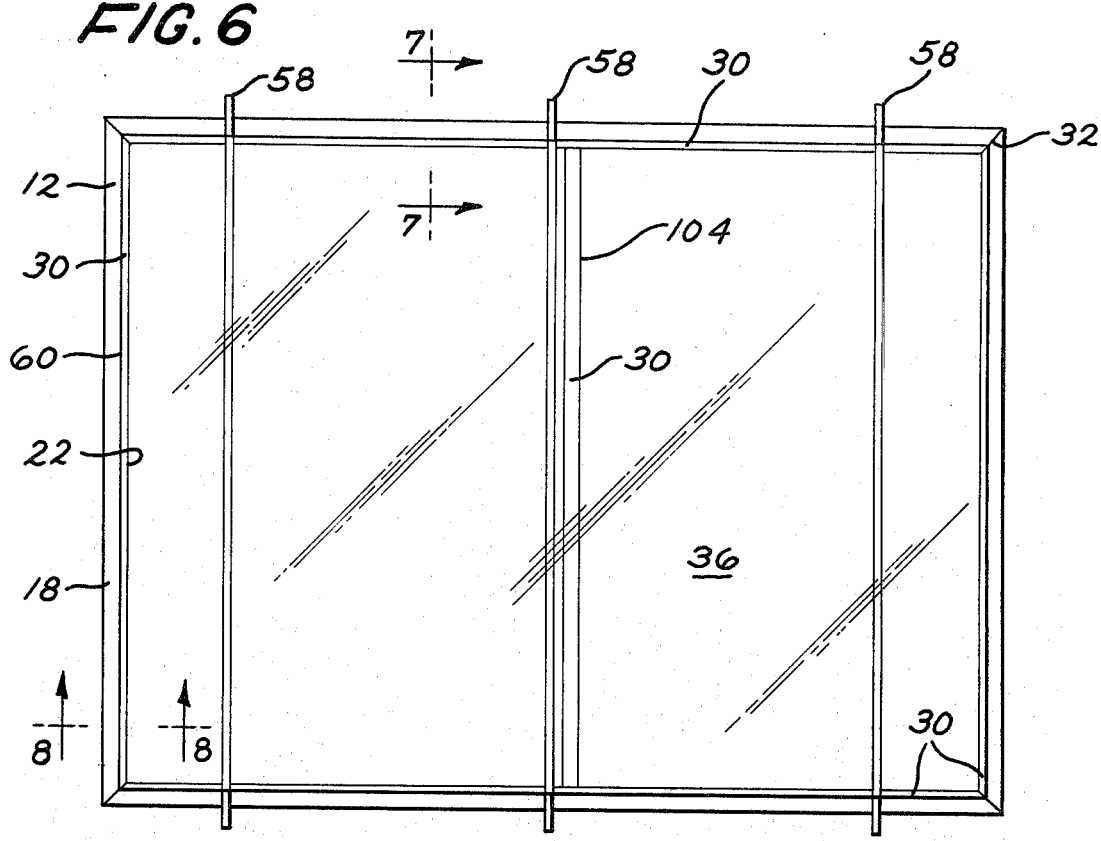
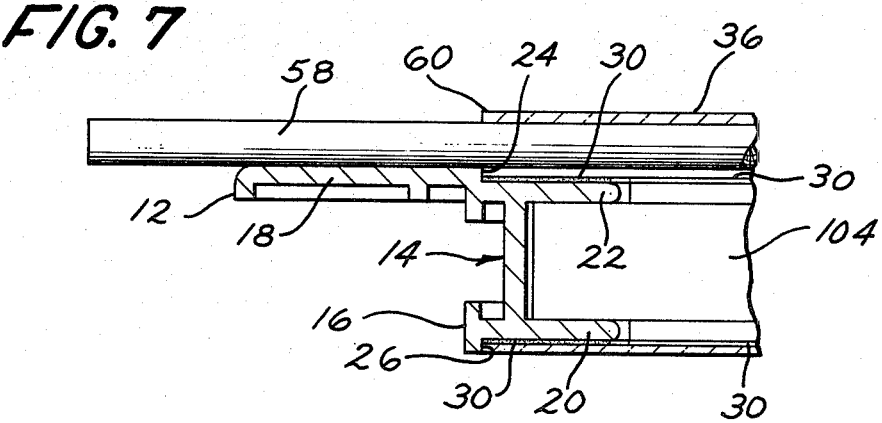
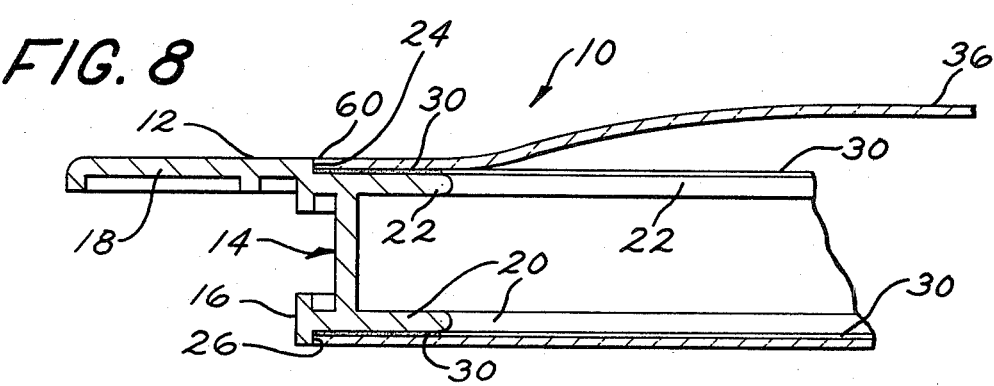

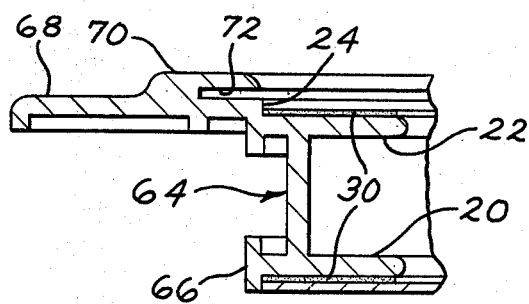
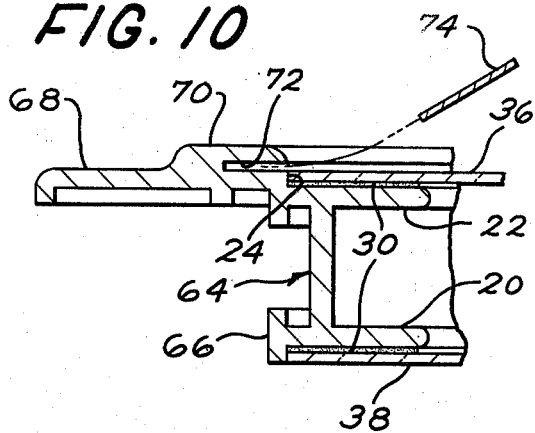
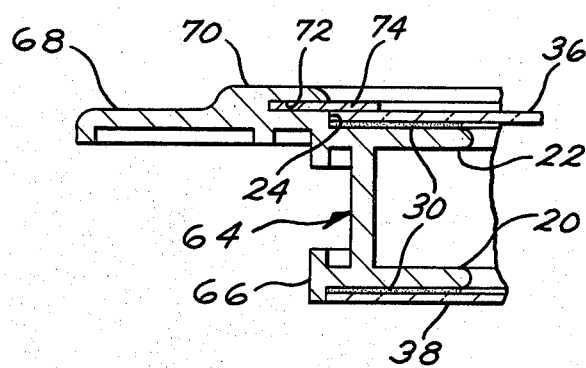
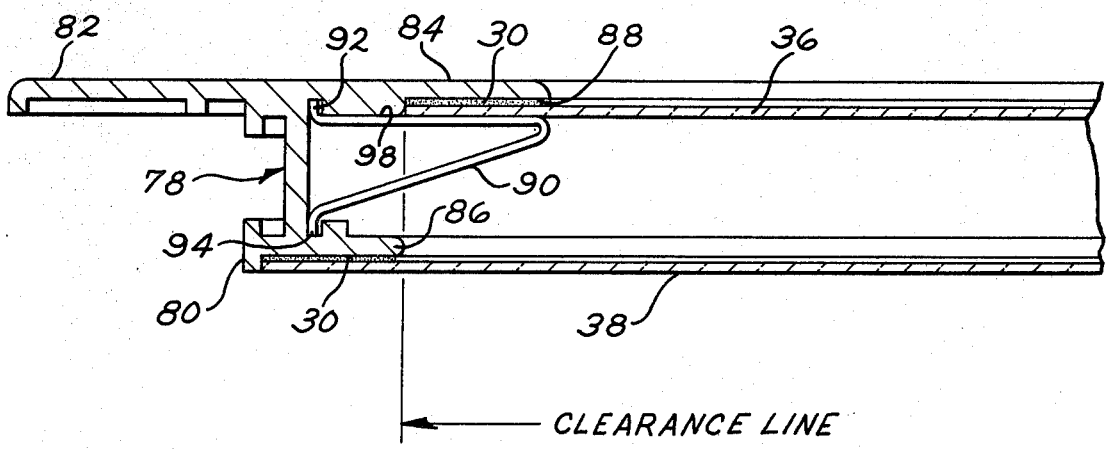

SOLAR PANEL

BACKGROUND OF THE INVENTION

1. Field of the Invention: This invention relates to the construction of a double panel window structure, and particularly one that is exposed to outside atmospheric conditions.

2. Description of the Prior Art: Double panel window structures are known in the prior art. Most of these are formed of outer frames that comprise a plurality of elements. One such window structure uses a liquid adhesive on the flanges of the outer frame, but such adhesive is hard to control and the panel must be assembled quickly; otherwise, the adhesive will set up. In the event the adhesive has set up, it is necessary to reactivate the adhesive with a solvent, and after the panel is assembled, it is necessary to go back and trim the excessive amounts of adhesive off the panel which makes the assembly time-consuming and laborious.

OBJECTS OF THE PRESENT INVENTION

The principal object of the present invention is to provide a double panel window structure having a rectangular outer frame with a pair of inwardly-directed flanges that are each furnished with a dual pressure-sensitive adhesive tape whereby a pane of transparent material is sealed around its periphery into engagement with the adhesive tape, where the tape has a width between ¼ inch and 1 inch and serves as the fastening means between the transparent pane and the side elements that make up the rectangular outer frame.

A further object of the present invention is to form a double pane solar panel of the class described by applying the dual surface adhesive tape to the uncut lengths of the extrusion from which the outer frame is formed so that when the extrusion is cut to these various lengths, the adhesive tape is simultaneously cut to fit, all in one operation.

A further object of the present invention is to provide a double pane solar panel of the class described wherein the sealing action between the dual surface adhesive tapes and the two transparent panes serves as the main fastening means holding the various outer frame elements together.

A further object of the present invention is to provide a solar panel of the class described with cross braces supported between two sides of the outer frame, there being dual surface adhesive tapes holding the interior surface of the transparent pane to the cross braces.

A still further object of the present invention is to provide a solar panel of the class described with additional mechanical means for clamping the transparent pane against the adhesive tape.

SUMMARY OF THE INVENTION

The present invention provides a double pane solar panel that has an outer box-like frame formed of separate side elements by an H-shaped frame member in transverse cross section, where the member has a pair of generally parallel legs or flanges that are inwardly directed of the frame. At least one surface of each parallel flange is furnished with a dual surface pressure-sensitive adhesive tape. A pane of transparent material is sealed around its periphery into engagement with the adhesive tape for holding the separate side elements of the frame together and forming a double pane solar panel.

BRIEF DESCRIPTION OF THE DRAWINGS

This invention will be better understood from the following description taken in conjunction with the accompanying drawings, and its scope will be pointed out in the appended claims.

FIG. 2 is taken looking into one of the sides of the outer frame from one end thereof, which explains why this figure is not cross-hatched.

FIG. 6 is a top plan view of a solar panel according to the present invention showing a series of three dowel sticks positioned transversely across the panel to support the pane of transparent material in a raised position prior to sealing the pane against the adhesive tape on one flange of the outer frame by using a method of slowly withdrawing the dowel sticks from under the pane.

FIG. 7 is a fragmentary, cross-sectional, elevational view taken on the line 7—7 of FIG. 6 to show one end of a dowel stick supported on top of the outer frame, with the transparent pane resting on the top of the dowel stick.

FIG. 8 is a fragmentary, cross-sectional view of one side of the outer frame of the solar panel taken on the line 8—8 of FIG. 6 and showing the flexibility in the pane of transparent material, so that one edge of the pane may be applied to the adhesive tape after the dowel sticks are shifted toward the opposite end of the outer frame until finally the entire transparent pane is sealed against the layer of adhesive tape.

FIG. 9 is a cross-sectional view of the outer frame extrusion, similar to that of FIG. 2, but showing a second modification of the present invention, which includes the use of a groove for receiving a wedge that applies a mechanical force on top of the edge of the pane to hold the pane into engagement with the adhesive tape.

FIG. 10 is an exploded view, similar to that of FIG. 9, showing the nature of the wedge member before it is inserted into its receiving groove.

FIG. 11 is a fragmentary, cross-sectional view of one side of the solar panel of this second modification of FIGS. 9 and 10 showing the wedge member in place in its final position.

FIG. 12 is a fragmentary, cross-sectional view of one side of the solar panel, similar to that of FIG. 11 except showing a third modification of the present invention with the use of a clip member that is assembled to the inner side of the extrusion that forms the outer frame to serve as a mechanical supporting means against the underside of one of the panes of transparent material for urging that pane into contact with a layer of adhesive tape that is formed on the underside of one flange of the extrusion.

DESCRIPTION OF THE PREFERRED EMBODIMENTS

Figure 1:
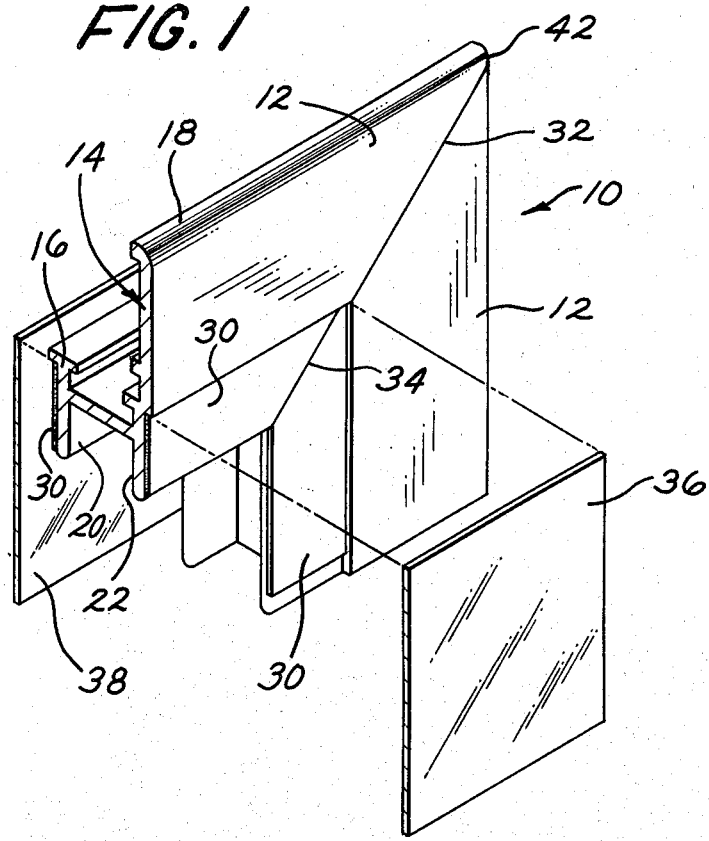
FIG. 1 is a fragmentary, exploded perspective view showing only one corner of the double pane solar panel of the present invention where the rectangular outer frame of the panel is shown formed of an H-shaped member or extrusion in transverse cross section with one of its outermost legs shortened, as well as showing a pair of generally parallel legs or flanges that are inwardly directed, with a dual surface pressure-sensitive adhesive tape formed on the outer surface of each flange for receiving and sealing with the peripheral edge of a pane of transparent material.

Turning now to a consideration of the drawings, and, in particular, to the fragmentary perspective view of FIG. 1, there is shown one corner of a double pane solar panel 10 embodying the present invention. This solar panel has a 4-sided configuration that is formed by an outer, rectangular box-like frame 12 by use of an H-shaped extrusion 14 in transverse cross section with one of its outermost legs 16 shortened, where the other outermost leg 18 is extended, and there is a pair of generally parallel legs or flanges 20 and 22 that are inwardly directed of the frame 12. The top side of the extrusion 14 is the side that includes the extended, outermost leg 18, while the underside of the extrusion is considered to be the side that includes the legs 16 and 20. Notice in FIG. 2 that the leg or flange 22 is recessed by an undercut, as at 24. In a similar manner, the underside of the leg 16 and 20 is recessed by means of an undercut 26. The outer surface of each of these parallel legs or flanges 20 and 22 is furnished with a dual surface pressure-sensitive adhesive tape 30. Actually, this tape extends beyond the parallel legs 20 and 22 and into the area of the outermost legs, as is clear from FIG. 2. It has been found important that the width of this adhesive tape 30 should be no less than ¼ of an inch. The optimum width is somewhere between ¼ of an inch and 1 inch, depending upon the overall size of the solar panel.

Figure 5:
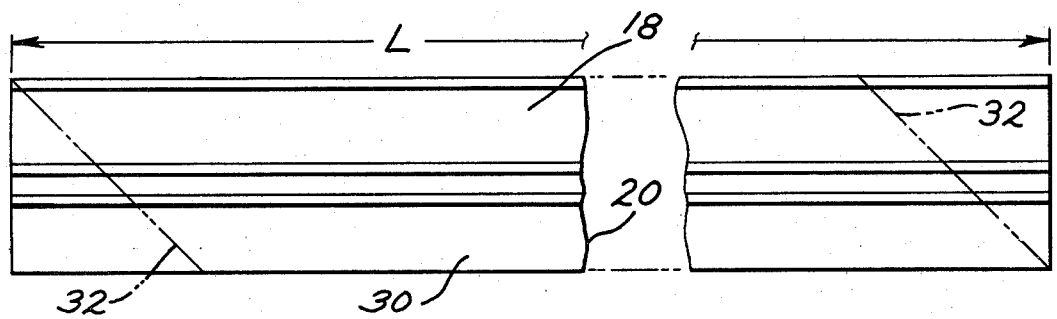
FIG. 5 is an underside plan view of an uncut length of the H-shaped extrusion which is broken in the middle so that it will fit on the drawing, it being understood that this extrusion may be 12 to 15 feet in length. Shown in broken lines at the end of the figure are the 45 degree mitered joints for cutting this extrusion into the required lengths for forming the box-like outer frame of the solar panel.

As mentioned earlier, FIG. 5 is an underside plan view of a long length of the extrusion 14, where the figure is broken in the middle in order to fit it on the drawing. This figure is provided to illustrate that the dual surface adhesive tape 30 is applied to the extrusion 14 in the uncut length of the extrusion on the order of 10 to 15 feet for example. It will be recognized by those skilled in this art that such dual surface tape is supplied with a removable paper cover or strip (not shown) to maintain the integrity of the pressure-sensitive nature of the tape until the tape is to be applied to some other element.

Figure 2:
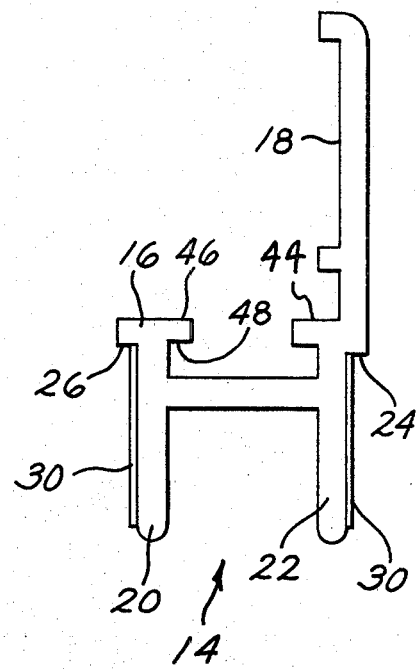
FIG. 2 is an enlarged showing of the transverse cross section of the H-shaped member or extrusion that forms the rectangular outer frame of the solar panel when the extrusion is cut to length with beveled corners. This
Figure 3:
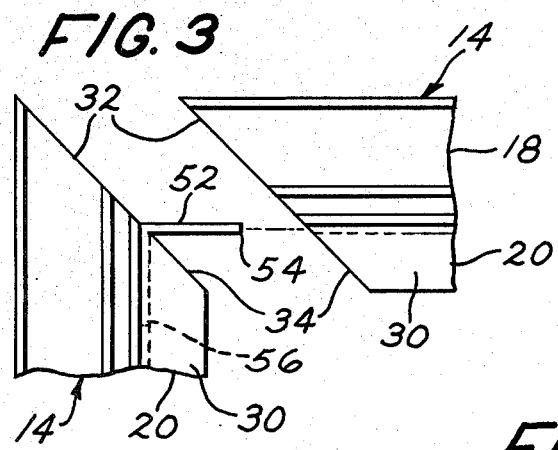
FIG. 3 is a fragmentary, exploded view looking at the underside of one corner of the outer frame where the adjacent sides of the frame are spread apart, and a small L-shaped clip member is installed to serve as an additional fastening means at the corner of the outer frame.
Figure 4:
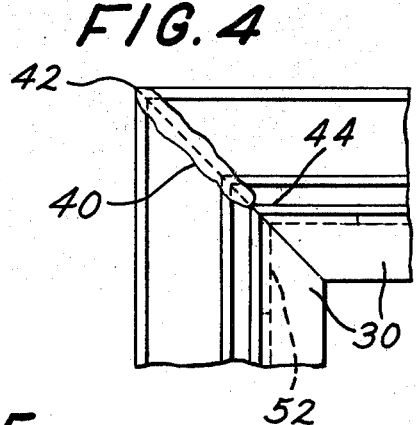
FIG. 4 is another fragmentary, underside view, similar to that of FIG. 3, after the adjoining members are assembled at the corner, and there is shown a strip of a weather sealant that is applied to the underside surface of the mitered joint of the single outermost leg of the extruded member.

Certain standard sizes of the solar panel of the present invention have been developed, such as a rectangular shape having dimensions 3 feet by 4 feet. Other variations are 36 inches by 44 inches, 32 inches by 44 inches, and 31 inches by 63 inches. The outer frame 12 is formed by cutting mitered joints at a 45 degree angle, as shown in dotted lines 32. While the extrusion is being cut, the tape 30 is also cut with a very sharp edge so that it presents a clean abutting surface of the tape, as at 34 shown in FIG. 3. The four sides of the outer frame 12 may be assembled in a jig (not shown) so as to hold these four pieces of extrusion in their final box-like frame configuration, as is illustrated in FIG. 6. The thought here is that the frame 12 is supplied with two panes 36 and 38 of transparent material, such as a modified glass acrylic sheet, polyester sheet, or a clear acrylic that is sold under the trademark Lexan, and similar plastic materials. The pane 36 is the outermost pane, and it is to be supported on the outer surface of the leg or flange 22, while the other pane 38 is to be supported on the underside of the frame on the legs 16 and 20, as is best seen in FIG. 1. The top pane or outermost pane 36 fits down into the recess 24 and into tight sealing engagement with the dual surface pressure-sensitive adhesive tape 30 that is adhering to the outer surface of the leg 22 and extends over a small portion of the extended outermost leg 18. In a similar manner, the bottom pane 38 fits into the recess 26 and into sealing engagement with the tape 30 that covers the outer surface of the leg 20 and a portion of the shortened leg 16. Once these two panes, 36 and 38, are in place in sealing engagement with the tape, there is a strong mechanical bond between the panes and the four sections of the outer frame 12, such that no further mechanical fastening means need be applied in order to make this a unitary working structure. It is possible to work with close tolerances such that the sealing action of each pane 36 and 38 with the adjacent adhesive tape forms a strong water-tight seal that prevents water and any other liquid from penetrating beneath the panes 36 or 38 and filling the void between the panes during use. Rugged experimental tests have been run on this completed structure, and a water load as much as 10 inches deep has been held on top of the solar panel for long periods of time without moisture penetrating under the pane 36. One sealing action is necessary to prevent moisture from penetrating the mitered joint 32 of the outermost extended leg 18, as is clear from FIG. 4. This figure is a fragmentary underside view of one corner of the outer frame 12, and a weather sealant 40 is applied along the mitered joint 32 from the tip 42 of the corner to a central rib 44, where the rib 44 extends longitudinally of the extrusion, generally in alignment with the free end of the shortened leg 16. Notice in FIG. 2 that the free end of the shortened leg 16 has a rib 46 that is generally symmetrical with the rib 44 to form a shallow groove 48. The nature of this shallow groove 48 is best seen in FIG. 2. It should be realized that when this extrusion 14 is formed with a mitered joint 32 that the shallow groove 48 of one piece of the frame will be aligned with a similar shallow groove 48 in the adjacent piece of the frame. Now look at FIG. 3, where there is shown a right-angular metal clip 52 having two legs 54 and 56. Looking at FIG. 3, the leg 56 of the clip 52 is inserted in the shallow groove 48 of the left-hand piece of extrusion and the other leg 54 of the clip is in a position to fit into the shallow groove 48 of the right-hand piece of extrusion when the two pieces of extrusion are brought together, as is seen in FIG. 4.

FIGS. 6-8 illustrate a novel method of lowering the pane 36 or 38 into position onto the dual surface adhesive tape 30. Looking at FIG. 6, a plurality of thin dowel sticks 58 are shown positioned transversely across the outer frame 12, and the outer pane 36 is shown resting across three of the dowel sticks. The pane 36 is more or less positioned directly above the position it will be in when it is sealed against the adhesive tape 30. Now, while the pane 36 is held from moving, the dowel sticks 58 are slowly shifted toward one end of the frame 12, thereby pulling the dowel sticks out from supporting position under the pane so that a first edge 60 of the pane 36 is lowered onto the tape 30, as is best seen in FIG. 8. The pane 36 is fairly flexible so that one end of the pane 60 can be in sealing engagement with the tape while the other end is still supported on the remaining dowel sticks 58. Once one end 60 of the pane 36 is sealed with the tape 30, then it is a simple matter to continue to remove the dowel sticks until the pane finally lowers onto the tape 30 and is pressed into tight sealing engagement therewith. While this method may seem simple, it has been of great advantage in the assembly methods of these solar panels in mass production with complete reliability and with a minimum of wasted time.

FIGS. 9-11 show a second modification of the present invention which exerts a mechanical squeezing action on the top panel 36. FIG. 9 shows a modified H-shaped extrusion 64 where one outermost leg 66 is shortened, and the other outermost leg 68 is extended. There are also a pair of generally parallel, inwardly-directed legs 21 and 22. The main difference in this extrusion 64 is that the outer surface of the extended leg 68 is provided with a raised embossment 70 adjacent the recess or undercut 24. This embossment 70 includes a horizontal slot 72 that is adapted to receive in sidewise placement an elongated strip or wedge 74 of sheet metal, as is shown in the exploded view of FIG. 10, as well as shown in the final assembled view of FIG. 11. This elongated strip 74 would substantially extend the length of each side of the outer frame 12 for appearance sake, although another modification would be to use short lengths of the strip 74. One advantage of using this locking wedge 74 is that under extreme high temperature conditions the plastic pane 36 tends to distort, and thereby lift off of the adhesive tape 30.

FIG. 12 shows a third modification of the present invention using a modified H-shaped extrusion 78 having a shortened outer leg 80 and an extended outer leg 82. Matching the extended outer leg 82 is an extended inner leg 84. There is also a second inner leg 86. One of the main features of this third modification of FIG. 12 is that both panels 36 and 38 are to be installed from the underside of the extrusion 78. This is possible because the recessed portion 88 of the underside of the extended inner leg 84 is inwardly offset from the other inner leg 86, as is clear by the clearance line 90 that extends from the innermost tip of the inner leg 86 to the outermost edge of the recessed portion 88 of the extended inner leg 84. Said in simpler terms, the extrusion 78 would be inverted from the position that is shown in FIG. 12, and the outermost pane 36 would first be lowered into the position as shown, and before the innermost pane 38 is put in place. It should be understood that the dual surface adhesive tape 30 is affixed to the underside of the extended inner leg 84 for making a sealing engagement with the outer pane 36. A triangular clip member or molding 90 is assembled between the inner legs 84 and 86 and held in place by means of folded tips 92 and 94 which slip into mating grooves 96. This triangular clip member or molding 90 has a horizontal supporting surface 98 and an inclined brace member 100 for exerting a strong force against the underside of the outer pane 36.

The inner pane 38 is assembled in the usual manner to the inner leg 86.

Having described above a novel design of solar panel having two panes of transparent plastic material that are each sealed by use of a dual surface, pressure-sensitive adhesive tape, it will readily be apparent to those skilled in this art that if more holding power is needed for the outer pane 36, the recessed or undercut portion 24 could be extended to cover both the inner leg 22 and the outer extended leg 18 to give a double width recess using a double width adhesive tape. Another means of strengthening the holding power between the adhesive tape and the plastic pane 36 or 38 is to employ cross beam 104 of generally I-beam configuration, as shown in FIG. 6, transversely across the outer frame so as to be supported from the inwardly-directed legs or flanges of the extrusion where the top and bottom surface of this I-beam cross brace would be in direct contact with the adjacent surface of the outer pane 36 and inner pane 38. By that is meant that the dual surface adhesive tape 30 would be applied to this top and bottom surface of the cross beam, and thereby be in sealing engagement with the inner surface of the outer pane 36 and inner pane 38, so as to give increased adhesive action between the panes and the cross beam, and from the cross beam to the outer frame. It should also be understood that the term "transparent" pane should be interpreted in the broad sense to include panes that may be translucent and perhaps approaching opaque. This all depends on the amount of sun or light that is desired to pass through the double panel window structure. Also, the outer frame of the solar panel need not be square or rectangular. It could also be circular, oval or of other desired shapes that are all within the scope of the present invention.

As to the second modification of FIGS. 9-11, the horizontal slot 72 could be slightly inclined from the horizontal so the wedge 74 will exert a downward force on the edge of the pane 36. Another modification to achieve this same objective would be to put a slight transverse arch in the wedge 74 along the length thereof so the wedge will exert a positive downward force on the edge of the pane.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. A double pane solar panel comprising an outer, rectangular box-like frame formed of separate side elements by an elongated H-shaped member in transverse cross section, said member having a pair of generally parallel legs or flanges that are inwardly directed of the frame, at least one surface of each said inward flanges being furnished with a double contact pressure-sensitive adhesive tape having a width greater than ¼ inch and less than 1 inch, and a pane of transparent material being sealed around its peripheral edge into engagement with the adhesive tape on each of the pair of parallel flanges for forming a double pane solar panel that is substantially water-tight under atmospheric conditions, the said rectangular outer frame has one of its outermost legs shortened and the frame has mitered joint corners, the underside surface of the mitered joints of the longer outermost leg being covered with weather sealant to render that area substantially water-tight, the said double contact adhesive tape being applied to the flanges of the H-shaped member in its uncut raw form prior to the time the H-shaped member is cut to lengths with mitered joint corners so that the ends of the tapes are likewise mitered and fit together with a butt joint, the sealing action between the double contact adhesive tapes and the two transparent panes serving as a sufficient fastening means holding the separate side elements of the outer frame together.

2. The invention as recited in claim 1, wherein the said panes of transparent material are taken from the class of modified glass acrylic, clear acrylic, and polyester materials.

3. The invention as recited in claim 1, wherein a series of thin dowel sticks are transversely arranged across the outer frame prior to installing each of the transparent panes, and then a pane is supported on top of the dowel sticks centered with respect to the related double contact adhesive tape, and then the dowel sticks are shifted toward one end of the outer frame causing the pane to be lowered with precision into sealing engagement with the adhesive tape.

4. A solar panel comprising an outer box-like frame formed of an elongated H-shaped member in transverse cross section, said member having a pair of generally parallel legs or flanges that are inwardly directed of the frame, at least one surface of each said inward flanges being furnished with a double contact pressure-sensitive adhesive tape having a width greater than $\frac{1}{4}''$, and a pane of transparent material being sealed around its peripheral edge into engagement with the adhesive tape on each of the pair of parallel flanges for forming a double pane solar panel that is substantially water-tight under atmospheric conditions, wherein one of the outermost legs of the frame member is shortened, and the one of the said inward flanges that is adjacent the longer outermost leg is lengthened, and the innermost surface of this lengthened flange is provided with one of the said double contact tapes, this innermost taped surface of the lengthened inward flange being inwardly disposed of the innermost edge of the other inward flange so that both of said panes may be installed to the outer frame from the inner side of the solar panel frame, and an elongated molding assembled between the said pair of inward flanges and bearing against the outer pane to hold this pane into sealing engagement with the innermost taped surface of the lengthened inward flange.

5. The invention as recited in claim 4, wherein the said elongated molding is an angular sheet metal form having a horizontal supporting strip for engaging under the outer pane and an angular bracing strip, where the free ends of the angular sheet metal form have hook-shaped edges for engaging into mating grooves in the interior of the H-shaped frame member forming the outer frame.

* * * * *